March 18, 1952 R. P. CORPORON 2,589,477
OSCILLATION GENERATOR SYSTEM
Filed March 28, 1946
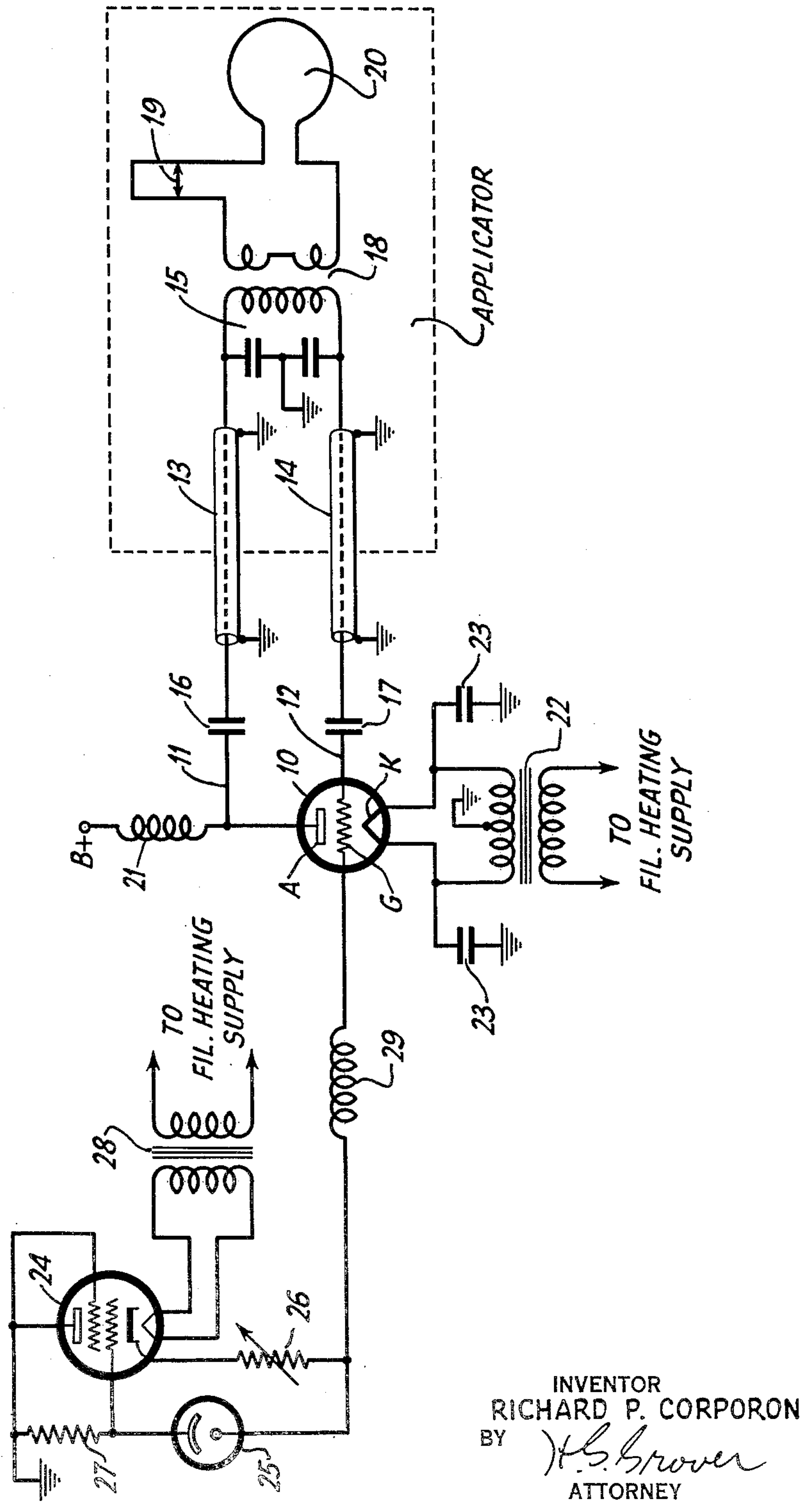
INVENTOR
RICHARD P. CORPORON
BY H. S. Grover
ATTORNEY Patented Mar. 18, 1952 2,589,477

UNITED STATES PATENT OFFICE 2,589,477

OSCILLATION GENERATOR SYSTEM

Richard P. Corporon, Haddonfield, N. J., assignor to Radio Corporation of America, a corporation of Delaware Application March 28, 1946, Serial No. 657,697

14 Claims. (Cl. 250—36)

This invention relates to a method of and apparatus for controlling the direct current through the grid of a vacuum tube oscillation generator.

In using vacuum tube oscillation generators for industrial heating purposes (for example, in an induction heating system), the load on the generator often changes under different conditions. Under normal operating conditions, the grid excitation voltage increases with a decrease in load, and vice versa. When the oscillator is used for industrial heating purposes, the load heats up and causes a different anode current condition in the oscillator vacuum tube. This different anode current condition tends to increase the grid direct current above a safe value or to decrease the grid direct current to a point of unstable operation, depending upon the direction of anode current change in the oscillator vacuum tube.

Hitherto, the grid current in an oscillator tube has been controlled manually, or partially by the use of conventional resistors. When using a manual control, it is necessary to make skillful adjustments of the equipment under different conditions of use.

An object of the present invention is to provide a more convenient and more efficient method of control of the grid current in an oscillation generator under different load conditions than prior systems.

Another object of the invention is to provide an automatic, instantaneous, and continuously variable control of the grid direct current of an oscillation generator under different loading conditions.

In effect, the present invention restricts the value of the grid direct current of an oscillation generator to a safe maximum value while maintaining grid bias conditions for optimum efficiency. This is done, broadly stated, by maintaining the grid direct current practically constant for all loading conditions encountered during use of the oscillator, in an automatic and instantaneous manner. By way of illustration, for one particular type of vacuum tube under different loading conditions the grid direct current may vary in a range from 70 mils to 150 mils without the use of the present invention. By using the present invention, I am able to limit the grid direct current in this same oscillator tube under similar varying loading conditions to a range of 90 to 100 mils and closer.

A more detailed description of the invention follows in conjunction with a drawing whose single figure illustrates, by way of example only, the control system of the invention applied to an oscillation generator of an induction heating system.

Referring to the drawing, there is shown the high frequency generator portion of a high frequency induction system together with the control apparatus constituting the gist of the invention. The oscillation generator is in the form of a Colpitts oscillator circuit and comprises a vacuum tube 10 whose anode A and grid G are connected via leads 11 and 12, and concentric transmission lines 13 and 14, respectively, to opposite terminals of the tank or frequency determining circuit 15. Blocking condensers 16 and 17 are provided between the anode and grid electrodes and the tank circuit 15. The apparatus shown in the rectangular box composed of dash lines is called the applicator unit and is somewhat removed from the vacuum tube 10 by a distance of let us say 25 or more feet. It is for this reason that the concentric lines 13 and 14 are provided as links between the vacuum tube 10 and the applicator unit. Obviously, if desired, the applicator unit may be located very close to the vacuum tube 10, in which case the concentric lines 13 and 14 may be omitted or folded to enable a variation in the distance between the applicator unit and the oscillator vacuum tube.

It should be noted that the tank circuit 15 includes the primary winding of a transformer 18 whose secondary winding is connected in series with a variable reactance loop 19 and the work coil 20. The work coil 20 is adapted to be placed around the metallic object or batch of metallic material to be heated for providing large concentrations of heat. The variable reactance 19 is a power control feature in the output circuit.

The anode A of the vacuum tube oscillator 10 is supplied with direct current anode polarizing potential B+ through a suitable choke coil 21. The cathode K of the oscillation generator is supplied with filament heating current through an iron core transformer 22. The midpoint of the secondary winding of the iron core transformer 22 is grounded, while the terminals of the secondary winding are shunted or by-passed to ground for high frequency energy of the operating frequency by means of by-pass condensers 23, 23.

An important feature of the invention comprises the use of a high mu vacuum tube 24 and a voltage regulator tube 25 so connected and arranged as to maintain the same grid direct current in the oscillator tube 10 under the optimum operating conditions, despite variations in the load. Vacuum tube 24 is shown as a screen grid tube whose screen grid and anode are connected together so that the tube operates as a triode. A high mu tube 24 is used so that the anode resistance of this tube can be varied over a wide range by small changes in control grid voltage. Also, tube 24 is so chosen that it is a power tube which can dissipate an amount of power equivalent to that which may be lost in a bias resistor. The voltage regulator tube 25 is connected between the control grid and cathode of the tube 24 through a variable resistor 26. The control grid of tube 24 is also connected to the anode and to ground through a resistor 27. The filament of the high mu power tube 24 is supplied with heating current from an iron core transformer 28. That end of the resistor 26 which is directly connected to the cathode of the voltage regulator tube is also connected to the grid of the oscillator tube 10 through a choke coil 29. This choke coil functions to keep radio frequency energy out of the direct current grid circuit. The value of resistor 27 is such that it assures the constant firing of the voltage regulator tube 25 and limits the current through the regulator to a safe value.

The operation of the invention will now be given: The grid direct current flows through the inductor choke coil 29 and resistor 26 to the cathode of tube 24 and then through the space path of the tube 24 to ground. When there is a change in load conditions on the oscillator 10 due to the type of or conditions of the load which is surrounded by the work coil 20, there is an accompanying change in grid radio frequency excitation voltage which tends to change the grid direct current. To offset or compensate for this tendency to change the grid direct current, any increase in grid radio frequency excitation voltage causes an increase in the anode resistance of tube 24 and hence a decrease in the flow of oscillator tube grid direct current through the tube 24. The change in anode resistance of the tube 24 is always in such direction with change in grid radio frequency excitation voltage on the oscillator as to maintain substantially constant oscillator grid direct current. It will thus be seen that the tube 24 provides a current compensation effect for changes in the oscillator grid voltage. The foregoing results are achieved in part by regulator tube 25 which is in shunt with resistor 26, in turn, in series with the cathode of tube 24. The voltage drop across regulator tube 25 is always at a constant value, thus providing a voltage reference level. The difference between the voltage across regulator tube 25 and the voltage across resistor 26 is the voltage which controls the direct current through tube 24. Thus, if the potential drop across resistor 26 is 110 volts and the voltage drop across tube 25 is 105 volts, there is then a difference of 5 volts which is the control grid voltage for tube 24. With this assumption, there will be a certain anode resistance in tube 24 and a certain amount of direct current flowing through the oscillator grid circuit. Now, if the oscillator grid radio frequency excitation voltage changes to cause an increased voltage drop across resistor 26 to, let us say, 115 volts, there will then be a difference of 10 volts between the voltage drop across resistor 26 and the voltage drop across tube 25. This increased voltage difference biases tube 24 to a greater degree than before and causes a decrease in the flow of direct current through tube 24, and this decrease in direct current flow through tube 24 is equivalent to an increased anode resistance for tube 24. By the same reasoning, a change in oscillator grid radio frequency excitation voltage which causes a decrease in the voltage drop across resistor 26 will bias tube 24 to a smaller extent than before and hence cause an increase in the flow of direct current through the tube 24. This increase in the flow of direct current through tube 24 is equivalent to a decreased anode resistance for tube 24. It will thus be seen that the oscillator-grid direct current is maintained constant by this arrangement.

The regulator tube 25 provides a greater percentage change in the control grid voltage for tube 24 than the percentage change obtainable across a resistor used alone. As an example, if a resistor having a value of 1100 ohms were employed alone, a change of current through this resistor from 100 to 110 mils would cause a change in voltage drop from 110 to 121 volts across the resistor, and this change is about a 10% change in voltage applied to the grid of tube 24. If a voltage regulator tube such as tube 25 is employed with the 1100 ohm resistor, and is capable of producing a voltage drop of 105 volts, then with the same change in current from 100 to 110 mils, the voltage difference between the drop across tube 25 and the drop across resistor 26, which is applied to the grid of tube 24, would change from 5 to 16 volts, amounting to a 220% change in voltage.

In one embodiment of the invention successfully tried out in practice in connection with induction heating apparatus, the oscillator tube 10 was an RCA type 833-A power vacuum tube generating oscillations at 400 kc. and producing a 1 kw. power output. This oscillator tube was used in a self-excited Colpitts oscillator circuit. The voltage regulator tube 25 was an (OC3/VR105) type producing a constant voltage drop thereacross of 105 volts. The vacuum tube corresponding to tube 24 was an RCA type 807 high mu power vacuum tube.

Although the invention has been specifically described in connection with a Colpitts self-excited oscillator tube used for industrial heating purposes, it should be understood that the invention is not limited thereto but is applicable to various types of self-excited oscillator circuits for different purposes, where there may be desired a control in the grid direct current of the oscillator.

What is claimed is:

1. The method of maintaining constant the direct grid current of a radio frequency vacuum tube oscillator which comprises passing said current through a space discharge path and a resistor in series therewith, and utilizing the voltage drop across said resistor to continuously vary the resistance of said path in such sense and magnitude as to maintain said direct current constant despite changes in radio frequency excitation voltage on the grid of said oscillator tube.

2. In an electron discharge device system having a vacuum tube containing a grid electrode, means for automatically restricting the value of grid direct current to a safe and substantially constant value while maintaining grid bias conditions for optimum efficiency, said means including a resistor in series with a high mu vacuum tube connected to said grid and a voltage regulator tube in shunt to the series circuit of said resistor and a portion of the space current path of said high mu tube, said means including also means for assuring a continuous discharge through said voltage regulator tube.

3. An oscillation generator comprising a vacuum tube having a grid circuit, said circuit including a resistor in series with a high mu vacuum tube, a voltage regulator tube in shunt to the series circuit of said resistor and a portion of the space current path of said high mu tube, and means assuring a continuous discharge through said voltage regulator tube.

4. A self-excited oscillation generator vacuum tube having a grid and a circuit therefor, said circuit including a high mu power tube whose anode is connected to ground and whose cathode is connected to said grid through a resistor, said high mu tube having a grid, a voltage regulator tube connected between the grid of said high mu tube and that end of said resistor farthest removed from said cathode, and means for assuring a continuous discharge across said voltage regulator tube.

5. A self-excited oscillation generator vacuum tube having a grid and a circuit therefor, said circuit including a high mu power tube whose anode is connected to ground and whose cathode is connected to said grid through a resistor, said high mu tube having a grid, a voltage regulator tube connected between the grid of said high mu tube and that end of said resistor farthest removed from said cathode, and a resistor between the anode of said high mu tube and said voltage regulator tube, said last resistor having such value as to assure the continuous firing of said voltage regulator tube.

6. A self-excited oscillation generator system comprising a vacuum tube having a cathode, a grid and an anode, a frequency determining circuit coupled to said anode and grid, a high mu power tube also having a cathode, a grid and an anode, a connection from the anode of said high mu tube to the cathode of said first tube, a connection including the series circuit of a resistor and a choke coil extending from the cathode of said high mu tube to the grid of said vacuum tube, a voltage regulator tube connected between the grid of said high mu tube and the junction of said resistor and choke coil, and a resistor between the anode and grid of said high mu tube, said last resistor having such value as to assure the constant firing of said regulator tube.

7. An oscillation generator comprising a vacuum tube having a grid electrode, a resistor in series with a high mu vacuum tube connected to said grid, said high mu tube being a power tube capable of dissipating an amount of power which is equivalent to that which can be lost in a grid bias resistor, and a voltage regulator tube in shunt to the series circuit of said resistor and a portion of the space current path of said high mu tube.

8. An oscillation generator comprising a vacuum tube having a grid electrode, a resistor in series with a high mu vacuum tube connected to said grid, said high mu tube being a power tube capable of dissipating an amount of power which is equivalent to that which can be lost in a grid bias resistor, a voltage regulator tube in shunt to the series circuit of said resistor and a portion of the space current path of said high mu tube, and means assuring a continuous discharge through said voltage regulator tube.

9. A high frequency induction heating system comprising a self-excited radio frequency vacuum tube oscillation generator, said tube having a grid circuit with means therein for automatically restricting the value of grid direct current to a safe and substantially constant value while maintaining grid bias conditions for optimum efficiency, said grid circuit including a high mu power grid-controlled tube in series with a resistor connected between the grid and cathode of said vacuum tube, said resistor being nearest to the grid of said vacuum tube generator, and a voltage regulator tube connected between the grid of said high mu tube and that end of said resistor nearest the grid of said vacuum tube.

10. An oscillation generator system comprising a vacuum tube having a grid electrode and means in circuit therewith for causing said generator to produce oscillations, a high mu vacuum tube connected to said grid electrode, and a voltage regulator tube in shunt to a portion of the space current path of said high mu vacuum tube.

11. An oscillation generator system comprising a vacuum tube having a grid electrode and means in circuit therewith for causing said generator to produce oscillations, a high mu vacuum tube connected to said grid electrode, a voltage regulator tube in shunt to a portion of the space current path of said high mu vacuum tube, and means for assuring a continuous discharge through said voltage regulator tube.

12. A self-excited oscillation generator vacuum tube having a grid and a circuit therefor, said circuit including a power vacuum tube whose anode is connected to ground and whose cathode is connected to said grid through a resistor, said power tube having a grid, a voltage regulator tube connected between the grid of said power tube and that end of said resistor farthest removed from said cathode, and a resistor between the anode of said power tube and said voltage regulator tube, said last resistor having such value as to assure the continuous firing of said voltage regulator tube.

13. A self-excited oscillation generator system comprising a first vacuum tube having a cathode, a grid and an anode, a frequency determining circuit coupled to said anode and grid, a second vacuum power tube also having a cathode, a grid and an anode, a connection from the anode of said second vacuum tube to the cathode of said first tube, a connection including the series circuit of a resistor and a choke coil extending from the cathode of said second vacuum tube to the grid of said first vacuum tube, a voltage regulator tube connected between the grid of said second tube and the junction of said resistor and choke coil, and a resistor between the anode and grid of said second tube, said last resistor having such value as to assure the constant firing of said regulator tube.

14. An oscillation generator comprising a vacuum tube having a grid electrode, a resistor in series with a power vacuum tube connected to said grid, said power tube being capable of dissipating an amount of power which is equivalent to that which can be lost in a grid bias resistor, and a voltage regulator tube in shunt to the series circuit of said resistor and a portion of the space current path of said power tube.

RICHARD P. CORPORON.

REFERENCES CITED

The following references are of record in the file of this patent:

UNITED STATES PATENTS

| Number | Name | Date |
|---|---|---|
| 1,784,610 | Numans | Dec. 9, 1930 |
| 1,868,034 | Urtel | July 19, 1932 |
| 2,010,881 | Numans | Aug. 13, 1935 |
| 2,129,036 | Schlesinger | Sept. 6, 1938 |
| 2,180,364 | Norton | Nov. 21, 1939 |
| 2,304,552 | Deerhake | Dec. 8, 1942 |
| 2,398,916 | Brewer | Apr. 23, 1946 |

FOREIGN PATENTS

| Number | Country | Date |
|---|---|---|
| 486,185 | Germany | Nov. 13, 1929 |